United States Patent [19]

Fradin

[11] Patent Number: 5,017,393

[45] Date of Patent: May 21, 1991

[54] PROCESS FOR PREPARING RESTRUCTURED MEAT

[76] Inventor: Maurice Fradin, Résidence Le Jean Bart - 19. Esplanade de la Mer 85160, Saint Jean de Monts, France

[21] Appl. No.: 481,810

[22] Filed: Feb. 16, 1990

Related U.S. Application Data

[63] Continuation of Ser. No. 352,674, May 10, 1989, abandoned, which is a continuation of Ser. No. 124,790, Oct. 27, 1987, abandoned.

[30] Foreign Application Priority Data

Feb. 28, 1986 [FR] France .............................. 86 02793

[51] Int. Cl.$^5$ .............................................. A23L 1/317
[52] U.S. Cl. ..................................... 426/272; 426/388; 426/513
[58] Field of Search ................. 426/92, 272, 641, 388, 426/513

[56] References Cited

U.S. PATENT DOCUMENTS

| 2,255,796 | 9/1941 | Linane | 426/513 X |
| 2,527,493 | 10/1950 | Condon | 426/513 X |
| 2,673,156 | 3/1954 | Minder | 426/513 |
| 2,752,252 | 6/1956 | Condon | 426/513 |
| 4,072,763 | 2/1978 | Mart | 426/513 |
| 4,258,068 | 3/1981 | Huffman | 426/513 X |
| 4,377,597 | 3/1983 | Shapiro et al. | 426/92 |
| 4,539,210 | 9/1985 | O'Connell et al. | 426/513 X |
| 4,728,524 | 3/1988 | Gagliardi | 426/513 X |

FOREIGN PATENT DOCUMENTS 7001846 8/1970 Netherlands ....................... 426/513

*Primary Examiner*—Arthur L. Corbin
*Attorney, Agent, or Firm*—William A. Drucker

[57] ABSTRACT

A method for producing restructured meat is disclosed comprising the fragmentation of a muscle into strips; the formation of an elongate block by superposing said strips in a direction generally parallel to their length, with surface cooling of the strips; the cutting of the block of strips in a direction parallel to their length in order to obtain ultrathin sheets; and restructuration into meat pieces by assembling the ultrathin sheets in a shaping operation non destructive of the laminated texture. The resulting meat product has, before cooking, a structure and organoleptic characteristics which are very close to those of natural muscle.

3 Claims, No Drawings

PROCESS FOR PREPARING RESTRUCTURED MEAT

This application is a continuation, of application Ser. No. 07/352,674, filed May 10, 1989, now abaondoned. Which is a continuation of Ser. No. 124,790 filed Oct. 27, 1987, now abandoned.

FIELD OF THE INVENTION

The invention relates to methods for restructuring fresh meat into uniform meat portions such as beefsteaks, roast cuts, collops or the like, having the sensory attributes before cooking, including texture, tenderness, juiciness and flavor as close as possible to those of the natural muscle, starting from a cutting of the muscles, followed by mixing and shaping operations of the products of said division, with possible additives.

DESCRIPTION OF THE RELATED ART

Prior art is illustrated by US-A-2 255 796,and, more specifically, by GB-A-2 156 65 published on Oct. 16, 1985.

According to US-A-2 255 796, the meat is either cut into sheets "fine as paper" (the thickness of which is however not specified) or cut into chips or shredded, but the method does not belong to the above-defined field, as the cutting is followed by twisting, the searched aim being to tenderize the meat, not to reconstruct a texture close to that of the natural muscle.

According to GB-A-2 156 650, the meat is cut into sheets having a thickness of 1 to 3 mm, having preferably a surface substantially of the same dimensions as the original piece, i.e. at least 10 cm2 and, preferably, 20 cm2. In practice, in all the described examples, the sheet have surfaces of 100 cm2 and more. These slices are then kneaded in order to obtain cohesion of the particles, because of the exudation of the natural juices during the kneading operation and of the tangling of sheets which are bent in every direction. It is well specified that it is not a question of a simple kneading, massage or mixing, but that a kneading trough for pastry is used, provided with a hook or a blade. It is also specified that the sheets will properties close to thickness of 1.5 to 2 mm and that, if their thickness were substantially below 1 mm, a product of the emulsified kind would be achieved.

European patent application published on Mar. 26, 1986 under No. 0 175 397 discloses a two phase meat product having a texture imparting phase consisting of parallell aligned flat meat slices. Said slices have a thickness of from 0.5 mm to 6 mm. and preferably from 1 to 3 mm and a surface area of between about 100 or 200 cm2. A finely dispersed phase comprising fat, water and binding agent is added for obtaining binding of the slices.

SUMMARY OF THE INVENTION

None of the priority known methods gives to the, final product a behavior before cooking and gustative properties close to those of the natural muscle and, in particular, the tender muscles such as the fillet.

The Applicant has discovered that such a result is obtained when the restructuration method confers, to the final product a structure consisting of ultrathin sheets with a medium surface, mutually adhering together more or less regularly in a way which preserves the laminated texture.

The term "ultrathin sheets" hereinafter designates sheets whose thickness is substantially below 1 mm and at least a certain proportion of which in the structure has a thickness comprised between 2/10 and 5/10 mm, whereas the term "medium surface" designates surfaces of the order of a few cm2.

It is a primary object of the invention to provide a restructured meat product characterized by the above-defined laminated structure and a method for manufacturing this product.

Another object of the invention is to provide a meat product of the character described, made by a method comprising the following successive steps:

a- fragmentation of the preferably warm muscle (i.e. taken ante rigor mortis) into strips or elongate pieces having a medium surface cross-section, which cross-section advantageously has a size dimension comprised between 20 and 30 mm.

b- Formation of elongate blocks by superposing and pressing said strips the surface of the strips being refrigerated before pressing advantageously by introducing carbon dioxide snow.

c- Cutting of the blocks in a direction perpendicular to their length in order to obtain ultrathin sheets having a medium surface, and d- Restructuring into meat pieces by assembling the ultrathin sheets in a shaping operation non destructive of the laminated texture.

DESCRIPTION OF THE PREFERRED EMBODIMENT

Other features, as well as the advantages of the invention will become apparent from the following examples ;

EXAMPLE 1

Beef meat is cut ante rigor mortis into more or less big pieces the weight of which may reach 500 gr or even one kilogram. These pieces have the form of strips whose length is of 10 to 30 cm and who are advantageously of square cross-section with a side length of 20 to 30 mm. These strips are then introduced into a first mixer where they are very rapidly refrigerated by means of an efficient refrigerating product, advantageously by injection of carbon dioxide snow into the mixer. The, refrigerated strips which are covered with carbon dioxide snow are then placed in containers where they will stay for several hours, e.g. at 15° C. in order to stabilize the temperature.

Then, possibly after preservation in a refrigerator, they can be shaped by means of a press in order to form blocks having, for example, a square cross-section with a side length of 15 cm and a length of 30 to 40 cm, whose behavior, as long as the meat is at an appropriate temperature below 0° C. (e.g. between −5° C. and −10° C. at the strip surface, these strips not being entirely frozen) is sufficient for enabling them to be cut by a slicing machine into ultrathin sheets.

In these blocks, the strips are superposed in a direction generally parallel to their length, but the strips themselves have been cut in any direction with respect to that of the meat fibers.

The cutting is effected in a direction perpendicular to the length of the blocks and under refrigeration, preferably by injection of carbon dioxide snow into the cutting machine, in order to maintain the temperature of the sheets near 0° C., which prevents the development of germs and facilitates adherence of the sheets during the subsequent shaping operation.

The thickness of the sheets will advantageously be comprised between 2/10 and 3/10 mm, anyway below 5/10 mm for beef muscles of medium toughness.

At the end of the cutting operation each large slice of the block having a side length of 15 cm has in fact been subdivided into a plurality of sheets whose surface corresponds to that of the cross-section of the strips, and it is essential that this be the case in order to obtain mutual adherence between the sheets in the final product.

The fact must be stressed that it is not possible, neither with sheets having substantially bigger surfaces (2 or several tens of cm2), nor with chips having a surface of about 1 cm2 and a more or less regular thickness which may here and there be above one mm, to obtain the laminated texture and the desired consistency.

The ultrathin sheets are preferably subjected to a second mixing, operation which is only effected for some seconds and in a vacuum : the second mixing operation aims at eliminating the air between the sheets in order to facilitate their "bonding". It must not be prolonged to a point where the laminated structure risks destruction (which would be necessary if the sheets were thicker, in order to obtain their adherence).

The product obtained at the end of the second mixing operation has the form of more or less regular balls or bundles which are adapted to be shaped, either by means of a press in order to obtain roast meat which may possibly be cut or precut subsequently, or by means of a conventional beefsteak shaper.

As a variant, the sheets produced by the cutting machine may directly fall on a belt whose edges are folded under the action of rollers in order to form a continuous strip of meat which may then be cut into sections in order to form beefsteaks.

Anyway, it is essential that neither the second mixing nor the final operation of restructuring the meat pieces by shaping of ultrathin sheets be conducted so as to destroy the laminated texture : some of the sheets may be bent or even curled up and their assembly is more or less regular, but, when examining the final product, a relatively homogenous laminated texture is to be found which appears as being very close to that of the tender muscle such as fillet and its texture preservation before cooking is excellent.

EXAMPLE 2

One starts from white meat, e.g. veal and one proceeds as in the example 1, excepting the following particulars.

Cutting is effected by means of a machine by which sheets of a first thickness of 2 to 3/10 mm and sheets of a second thickness of 5 to 8/10 mm are simultaneously obtained.

The thinner sheets serve as a binding agent in the final product, but, in order to guarantee subsequent adherence ("bonding" of the sheets) which is more difficult to obtain than in the case of a tougher meat, a binding agent of the type used in the restructuration meat, such as egg white or the like is further pulverized. This pulverization of a binding agent on the sheets is preferably effected during the cutting operation, because, if it were effected during the second mixing, this latter operation would have to be prolonged more that the few seconds necessary for air elimination, which would be a risk of destroying the laminated structure.

I claim:

1. A process for making a final piece of restructured meat having a sheet texture, comprising the successive steps of:
   (i) preparing pieces of meat;
   (ii) compacting said pieces together to form elongate blocks;
   (iii) cutting said blocks for obtaining ultrathin sheets having a surface area substantially exceeding one cm2 while being substantially smaller than 20 cm2 and a thickness substantially below 1 mm;
   (iv) mixing the sheets together while preserving their integrity to form a relatively homogeneous sheet structure and than
   (v) compacting and shaping the sheet structure into glocks while integrally preserving said sheet structure.

2. A process as claimed in claim 1, wherein the mixing step is conducted in a vacuum and stopped before the sheet structure risks destruction.

3. A process as claimed in claim 1, wherein, the cutting of the blocks into ultrathin sheets is effected under refrigeration.

* * * * *